(No Model.)
F. M. LEWIS.
SPOKE HOLDER.
No. 498,719. Patented May 30, 1893.
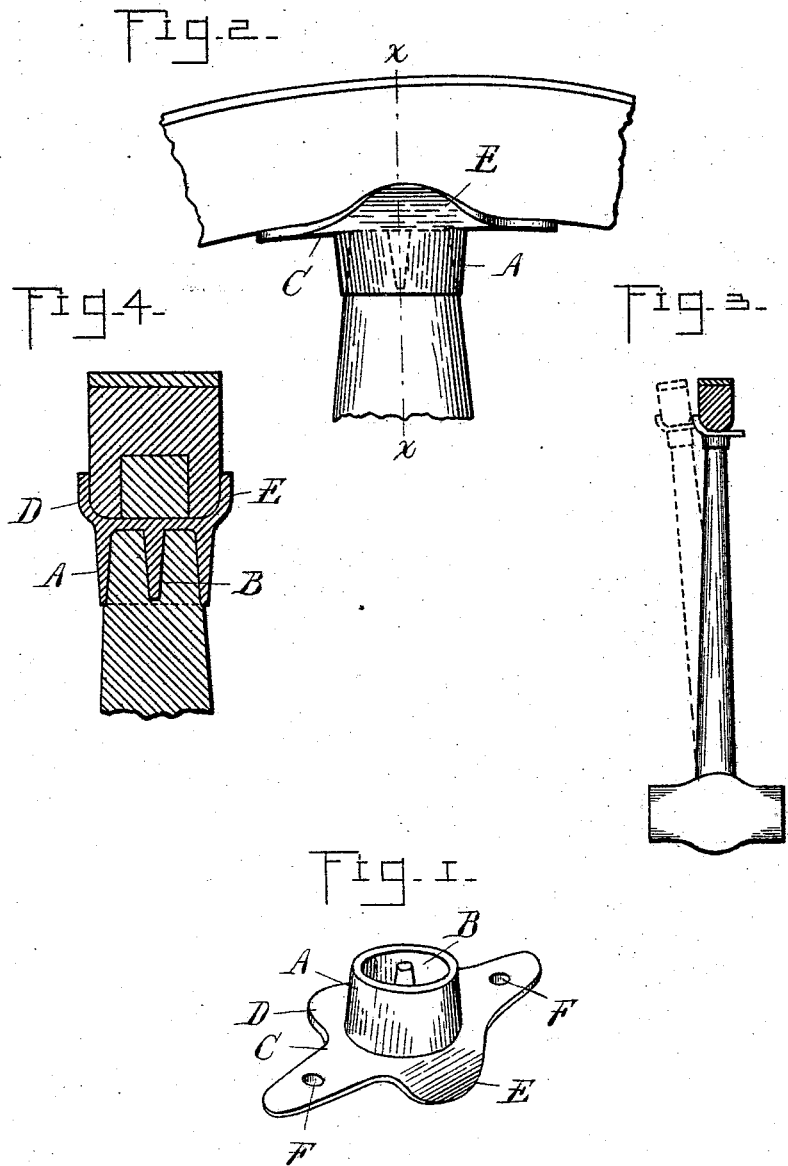
Witnesses:
Otto F. Barthel,
N. L. Lindop.
Inventor,
Frank M. Lewis
By Thos. S. Sprague & Son
Atty's

UNITED STATES PATENT OFFICE.

FRANK M. LEWIS, OF NORTH LANSING, ASSIGNOR TO WILLIAM B. VETTER AND GEORGE F. VETTER, OF LANSING, MICHIGAN.

SPOKE-HOLDER.

SPECIFICATION forming part of Letters Patent No. 498,719, dated May 30, 1893.

Application filed October 3, 1892. Serial No. 447,709. (No model.)

*To all whom it may concern:*

Be it known that I, FRANK M. LEWIS, a citizen of the United States, residing at North Lansing, in the county of Ingham and State of Michigan, have invented certain new and useful Improvements in Spoke-Holders, of which the following is a specification, reference being had therein to the accompanying drawings.

This invention relates to new and useful improvements in spoke holders, and the invention consists in the peculiar construction of a flanged holder adapted to receive the end of a spoke having means for securing the holder to the felly in repairing the spoke, all as more fully hereinafter described.

In the drawings, Figure 1 is a perspective view of my improved socket detached. Fig. 2 is a side elevation thereof showing it applied to the spoke. Fig. 3 is a section through the felly showing the spoke in elevation illustrating the manner of applying my device. Fig. 4 is a section on line $x\ x$ in Fig. 2.

When spokes become loose in a wheel it is desirable to repair it without removing the tire. To repair it, employing my spoke holder the tenon at the end of the spoke is withdrawn from the mortise in the felly and that which is left of the tenon is cut off and a good round smooth end left on the spoke. A central aperture is then bored in the end of the spoke and the socket A of the spoke holder is engaged over the spoke, the pin B extending centrally in the socket engaged in the aperture formed in the end of the spoke, and the plate C slipped beneath the felly. In order that this plate may be engaged beneath the felly without difficulty one of the side lips D is made flat, while the other side lip E is curved or bent up preferably to conform to the shape of the side of the felly. The parts are now in the position shown in Fig. 3 in full lines. The operator then bends up the lip D on opposite sides of the felly, as shown in Fig. 4 and places screws or nails through the apertures F in the plate C, which enter the felly and secure the device firmly in position. The socket A is tapering and this together with the tapering pin B entering the aperture in the end of the spoke will prevent any possibility of rattling of the spoke in the holder, while the two side flanges D and E being turned up tightly against the sides of the felly together with the screws passing through the apertures F will hold the socket to the felly against any possibility of displacement in use.

What I claim as my invention is—

1. In a spoke holder, the combination of a plate a socket depending therefrom adapted to engage the end of the spoke an outwardly extending pin within the socket and means for securing the plate to the inner face of the felly, substantially as described.

2. In a spoke holder, the combination of the plate C having the side lips D and E as set forth, and the central tapering socket A with the pin B, centrally arranged therein, the parts arranged and adapted to be used, substantially as described.

In testimony whereof I affix my signature in presence of two witnesses.

FRANK M. LEWIS.

Witnesses:
H. H. DARBY,
WM. B. VETTER.